United States Patent

[11] 3,554,182

[72] Inventors Francis M. Whitacre
148 Shoreview Road, Manhasset, N.Y. 11030;
John L. Umpleby, Tuthill Drive, Shelter Island Heights, N.Y. 11965
[21] Appl. No. 775,853
[22] Filed Nov. 14, 1968
[45] Patented Jan. 12, 1971

[54] LIQUID HEATER ESPECIALLY ADAPTED FOR LIQUID SUBMERGED USE
12 Claims, 4 Drawing Figs.
[52] U.S. Cl. .................................................. 126/360,
431/1, 431/347, 431/354
[51] Int. Cl. ................................................... F24h 1/20
[50] Field of Search ........................................... 126/360,
360A; 431/1, 354—347

[56] References Cited
UNITED STATES PATENTS

| | | | |
|---|---|---|---|
| 1,395,139 | 10/1921 | Porter | 431/354UX |
| 2,375,840 | 5/1945 | Ekstrom, Jr. | 126/360A |
| 2,379,155 | 6/1945 | Huff | 126/360UX |
| 2,767,784 | 10/1956 | Dean | 126/360X |
| 2,810,382 | 10/1957 | Warren | 126/360A |
| 3,044,551 | 7/1962 | Pryor | 126/360X |
| 3,194,229 | 7/1965 | Borgeson | 126/360 |

FOREIGN PATENTS

| | | | |
|---|---|---|---|
| 430,678 | 6/1935 | Great Britain | 431/354 |
| 687,303 | 2/1953 | Great Britain | 126/360 |

Primary Examiner—Frederick L. Matteson
Assistant Examiner—Robert A. Dua
Attorney—Burgess, Ryan & Hicks ABSTRACT: The invention relates to a liquid heater, especially adapted for liquid submerged uses, as for example, for heating a swimming pool. The heater has a mixing unit for air and fuel with a venturi configuration to permit the use of air under comparatively low pressures. The combustion generated is of the pulse type and the combustion chamber in which the fuel-air mixture is ignited has a body of material of high radiating potential, such as ceramic, which is heated in the combustion chamber and which radiates its heat to the enclosing heat-conducting walls of the chamber in contact with the liquid to be heated. An exhaust tube also submerged in the liquid to be heated carries the exhaust gases to a region near the surface of the liquid to be heated and discharges it into the liquid causing the liquid to splash against part of a discharge device at the outlet of the exhaust tube made of heat-conducting material, such as metal, to extract thermal energy from said exhaust gases.

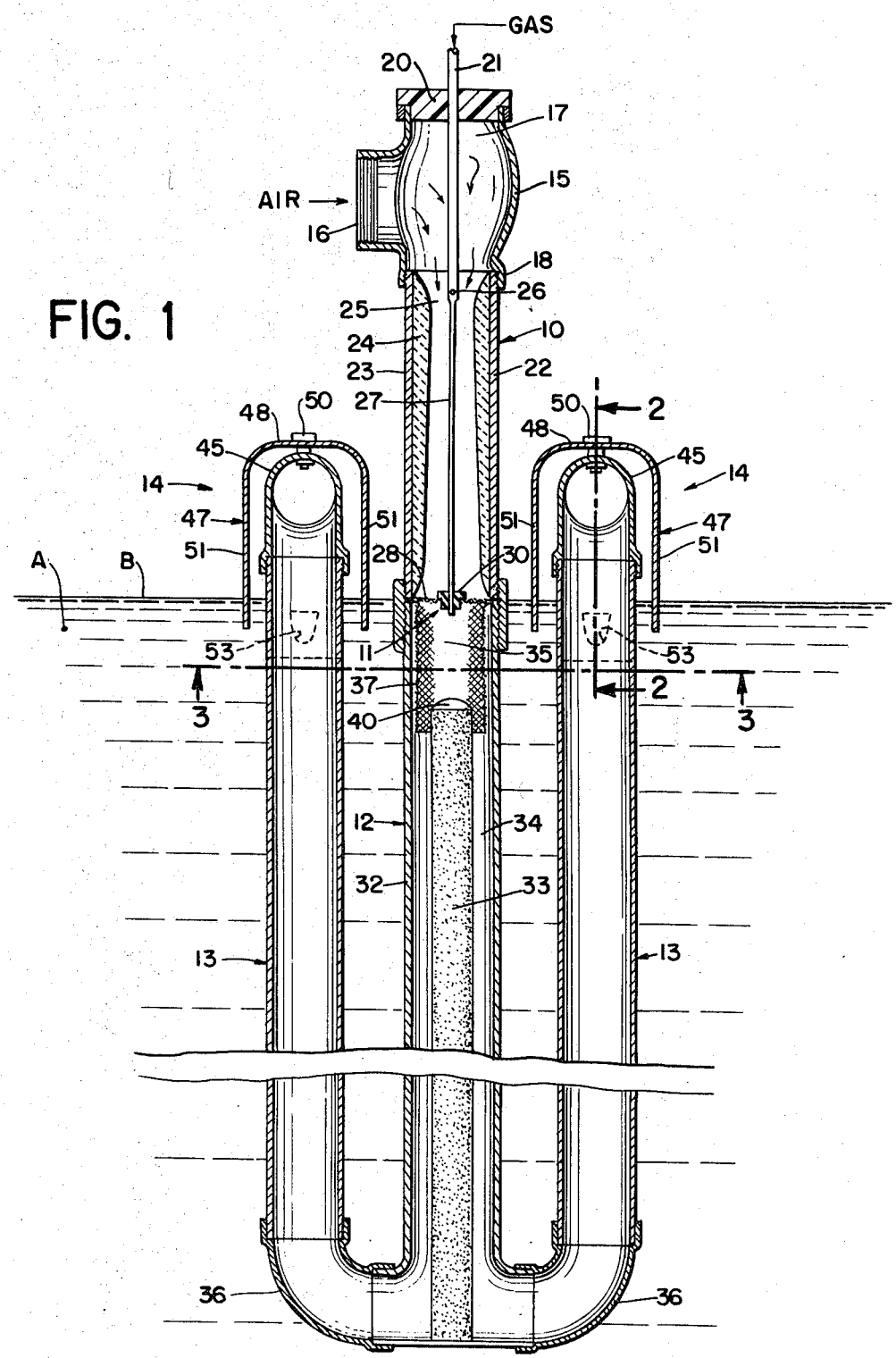

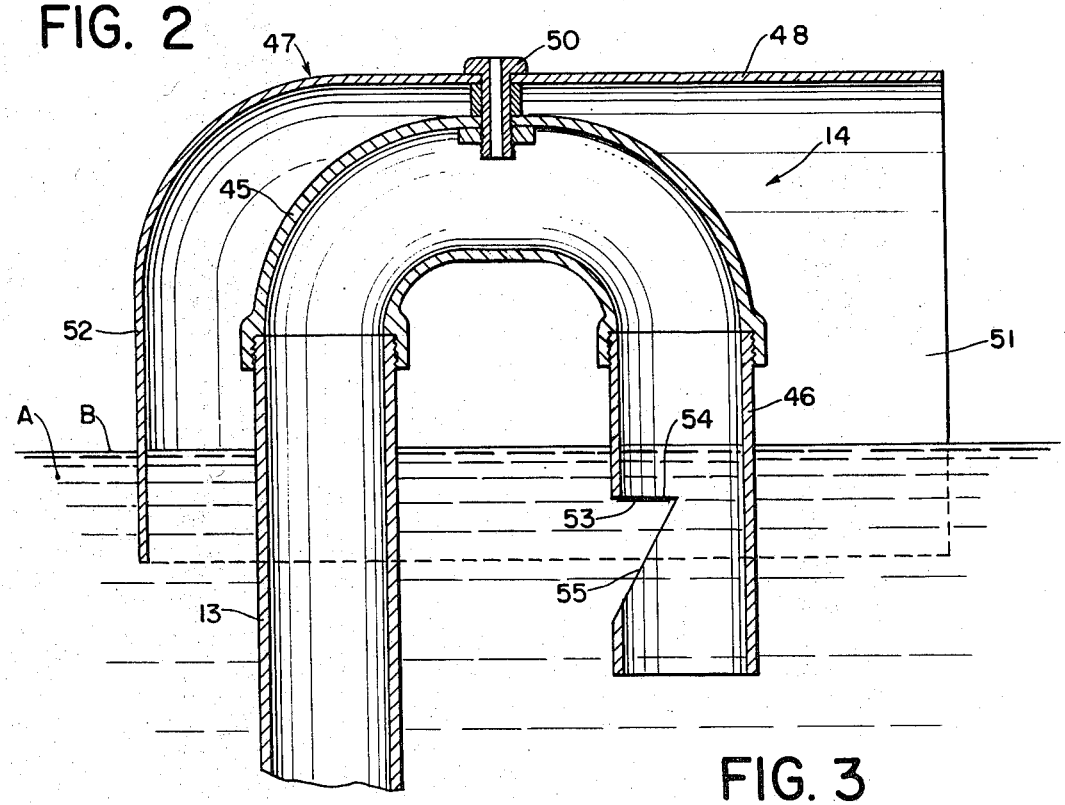
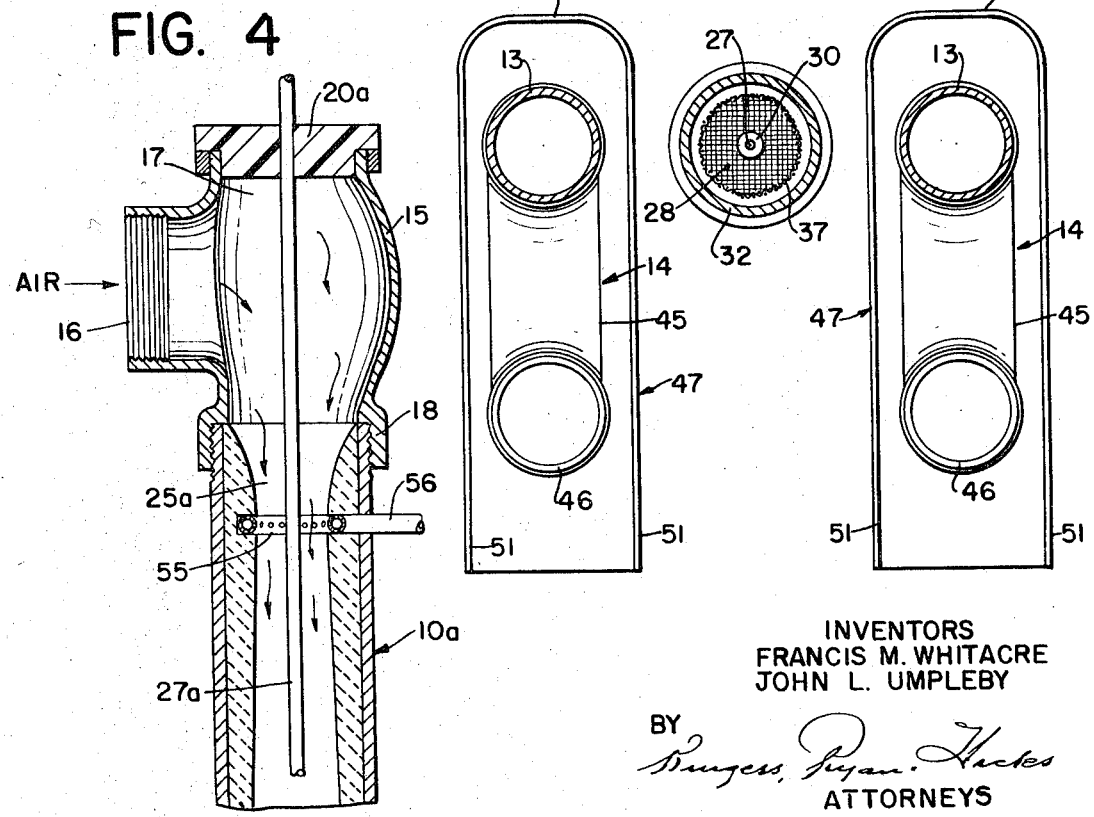
INVENTORS
FRANCIS M. WHITACRE
JOHN L. UMPLEBY
BY
ATTORNEYS

LIQUID HEATER ESPECIALLY ADAPTED FOR LIQUID SUBMERGED USE

The present invention relates to a liquid heater and, although the heater has a wide range of utility, it is particularly useful for heating the water in a swimming pool.

One object of the present invention is to provide a new and improved comparatively inexpensive heater for swimming pools or other liquid-heating applications, which is compact and highly efficient and which operates at comparatively low cost.

In accordance with certain features of the present invention, the heater is of the combustion type in which fuel-air mixtures are created and ignited, and resulting combustion is controlled to produce successive combustion pulses, resulting in high heat release in relatively small space and the scrubbing of the heat transfer walls of the combustion chamber substantially free from insulating deposits resistant to heat transfer.

As another feature of the present invention, the fuel-air mixing system and the ignition system are so combined, designed and correlated as to eliminate or at least minimize substantially flashbacks or backfiring and to is insure thorough fuel-air mixing before ignition.

As a further feature of the present invention, the combustion chamber is designed to promote surface combustion and to effect thereby a maximum of radiant energy release.

As another feature of the present invention, the heater is constructed to effect maximum heat by a design which affords (1) maximum radiation, (2) adequate surface area for convective heat transfer, (3) submerged combustion beneath the surface of the water or other liquid to be heated, and (4) discharge of the combustion exhaust through the water or other liquid being heated in the manner to recover substantial amounts of residual thermal energy from said exhaust without polluting the liquid to any significant extent.

Various other objects, features and advantages of the present invention are apparent from the following description and from the accompanying drawings, in which:

FIG. 1 is vertical section through a heater constituting an embodiment of the present invention and shown in operative position in a swimming pool for heating the water therein;

FIGS. 2 and 3 are sections of the heating device taken on the lines 2–2 and 3–3 respectively of FIG. 1 but shown on a larger scale; and FIG. 4 is a vertical section through a modified form of fuel-air mixing and igniting device for the heater, constituting another embodiment of the present invention.

Referring to FIGS. 1, 2 and 3 of the drawings, there is shown a liquid heater of the present invention, comprising in general a fuel-air mixing device 10, forming part of a burner, an ignition device 11 for the mixture produced in said mixing device and forming the other part of said burner, a combustion chamber 12 in elongated cylindrical form, two similar cylindrical exhaust tubes 13, symmetrically arranged on opposite sides of the combustion chamber parallel thereto and connected at one end to the downstream end of the combustion chamber, and exhaust discharge devices 14 at the other ends respectively of said exhaust tubes. The heater is shown in operative heating position in a pool of liquid A, which may be the water in a swimming pool, and is shown in upright position therein with the fuel-air mixing device 10 extending upwardly above the surface B of the water and the combustion chamber 12 submerged in said water.

The fuel-air mixing device 10 in the embodiment of the invention shown in FIG. 1, comprises a standard pipe tee 15 having a center inlet 16, and two aligned branches or limbs 17 and 18, the outer branch 17 being sealably closed by a plug 20, made of electrically insulating material, such as plastic or ceramic, and having a hole through which extends a feed pipe 21 for a fuel gas, such as propane. This fuel feed pipe 21 extends through the full length of the pipe tee 15, and beyond the outlet branch 18 of said tee. This outlet tee branch 18 is connected to the upper end of a mixing tube 22, which for the purpose of attaining good mixing of air and fuel, is designed as a venturi tube. For that purpose, the mixing tube 22 comprises an outer cylindrical standard pipe 23 of suitable metal, such as standard steel, copper or bronze, having an internal ceramic lining 24 of circular cross sections, formed or cast with venturi boundaries converging in opposite directions towards a throat region 25. The fuel feed pipe 21 extends vertically in operative position of the heater, and its lower end is centrally located in the mixing tube 22 and is closed except for a series of holes or ports 26 in the throat region 25 of the mixing tube, through which the fuel gas is discharged into said region. The air is delivered under pressure into the mixing tube 22 through the pipe tee inlet 16 by means of an inexpensive blower, such as that employed in connection with vacuum cleaners, and as this air passes through the venturi throat region 25 of the mixing tube 22 at high velocity, the fuel is injected from the fuel feed pipe 21 through its discharge ports 26 into said region. The agitation in the throat region 25 of the venturi mixing tube 22 and the high velocity of the air in this region, not only assures thorough and rapid mixing of the fuel and air but also prevents backflashes. The proportions of fuel and air are such as to produce a combustible mixture.

For ignition purposes, there is connected integrally or otherwise to the lower end of the fuel feed pipe 21 the upper end of an upright electrode rod or wire 27, made of suitable electrode metal, such as Nichrome (a ferrous alloy containing nickel and chrome) extending centrally through the fuel-air mixing tube 22. The lower end section of the electrode rod or wire 27 passes through a grounded screen grid 28, extending across the bottom of the fuel-air mixing tube 22 and across the top of the combustion chamber 12, and is spaced from said screen grid to form an annular spark gap between the electrode rod and the screen grid. This spacing is accomplished by means of a ceramic insulating spacer 30, through which the electrode rod 27 extends with a snug fit. A current discharge at high voltage for initial ignition passes through the fuel feed pipe 21 to the electrode rod 27 and for that purpose, the fuel feed pipe is made of conductive material. After initial ignition, no further current is required, since ignition is maintained by the thermal energy retained in the system. The screen grid 28 serves not only as a ground connection for sparking system, but also serves as a flashback barrier to prevent propagation of a possible flame into the fuel-air mixing chamber.

The combustion chamber 12 comprises a cylindrical tube 32 of heat conductive material, such as stainless steel, copper or brass, connected at its upper end to the lower end of the pipe 23 forming the outer shell of the mixing tube 22. Inside this combustion chamber 12 is a center core 33, which is in the form of a solid cylindrical rod, as shown, or which may be in the form of a tube if desired, and which is located at a distance from the peripheral walls of said chamber to provide around said core an annular space 34 where the combustion of the fuel-air mixture is completed. This core 33 is made of heat radiating material, such as ceramic, and is spaced at the top from the screen grid 28 to define an ignition and initial combustion expansion headspace 35 above said core. The core 33 extends to a region near the bottom of the heater where the exhaust tubes 13 connect to the bottom of the combustion chamber by a tee 36 and may be anchored at its lower end by a bracket (not shown), or fixed by a self-support.

To prevent quenching of combustion in the headspace 35 of the combustion chamber 12, so that the energy derived from this combustion is directed with maximum effect towards and alongside of the core 33, there is provided around this headspace and coaxial therewith, a cylindrical tubular screen 37 of heat resistant material, such as ceramic, or metal such as Nichrome or Inconel (chrome-nickel steel); when this c screen 37 is of metal, it may be in the form of a perforated or expanded sheet or a wire coil. The screen 37 is close to, but is equally spaced around its periphery from the peripheral wall of the combustion chamber tube 32 and extends from the screen grid 28 down to the top of the core 33 or to regions just below it, as shown. This peripheral spacing around the screen 37 is such that the screen attains a high temperature but is not sufficient to deteriorate the screen; reradiation of heat from this screen 37 prevents flame quenching and aids in preventing thermal destruction of the screen.

The system so far described produces pulse combustion with frequencies of explosion dependent on the geometry of the system. During periods of negative or less positive pressures in the combustion chamber 12, fresh mixtures of fuel and air are drawn into this chamber, and ignited by the thermal energy retained in the elements which are in the headspace 35 of the combustion chamber 12 through repeated cycles. The combustion initiated in this headspace 35 is continued in the annular space 34 surrounding the core 33 over the surface of said core and is completed in said space. This combustion operation serves to heat the core 33 to an extremely high radiating temperature.

The annular space 34 around the core 33 in conjunction with the ignition and initial combustion headspace 35 and the exhaust tubes 13 immediately following, all conjointly contribute to the establishment of pulsating waves having the effect of a hydrodynamic valve reducing backfiring and assisting in venting the products of combustion towards the exhaust exits of the system.

The advantages of the pulse combustion described are as follows:

1. Improved combustion is effected due to the increased pressure waves generated.
2. The increased velocity attained at the peak of pulsations, and the shock waves generated have the effect of scrubbing away the insulating static film of combustion products deposited on the inner surface of the peripheral walls of the combustion chamber 12, thereby minimizing one of the greatest resistances to heat transfer through these walls.
3. The transmittal of kinetic energy at the peaks of the pulses as well as the increased dissipation of thermal energy from the mass of compressed gas to the central core 33 increases the radiation potential of said core.

The noise emanating from the heater by the combustion pulses is muffled to an acceptable level by the submergence of the combustion chamber 12 in the water to be heated.

When the heater is operated with the exhaust under the water surface, increased back pressure results. If the water surface fluctuates due to the turbulence created by the exhaust, this may interrupt the pulsating cycles. To overcome this, a catalyst 40 is applied to the core 33. Should the combustion then be interrupted, the catalyst 40 reignites the air-fuel mixture and normal pulsation is thereby reestablished. The catalyst can consist essentially of powdered iron.

The basic function of the core 33 is to provide a source of radiant energy to be transmitted to the peripheral wall of the combustion chamber 12 in accordance with the Stephan-Boltzman principle, which states:

$$q = .173 AE \left[ \left( \frac{T_1}{100} \right)^4 - \left( \frac{T_2}{100} \right)^4 \right]$$

where $q$ = Rate of heat transfer in B.t.u./hr (B.t.u. h.)
$A$ = Area of core in sq. ft.
$E$ = Emissivity of core
$T_1$ = Temperature of core in degrees Rankin
$T_2$ = Temperature of receiving surface in degrees Rankin.

Therefore, assuming in a specific embodiment a core 33, 1 inch in diameter and 27 inches long with a flame temperature 3,000° F., we have $$A = \frac{1 \times Pi \times 27}{144} = \frac{84.82}{144} = 0.589 \text{ sq. ft.}$$

$E = 0.9$ (Assumed)
$T_1 = 3,460°$ R
$T_2 = 560°$ R then $$q = 0.173 \times 0.589 \times 0.9 [(34.6)^4 - (5.6)^4] = 95,798 \text{ B.t.u. h.}$$

Experiments with a prototype having the dimensions described above and having a combustion chamber 12 in which its encasing tube 32 is 2 inches in internal diameter, indicate that the heater of the present invention will operate at an efficiency of about 82 percent with the core 33, and at an efficiency of about 25 percent without said core.

In the operation of the heater so far described, the combustion in the combustion chamber 12 and over and along the surface of the core 33, heats this core to a very high temperature approaching incandesence. The energy absorbed by this core 33 is radiated to the peripheral walls of the combustion chamber 12 in contact with the water to be heated, to heat this water by heat transfer through these walls. In addition, some of the heat from the combustion in the chamber 12 is transmitted by convection to the peripheral walls of said chamber. The exhausts from this combustion chamber 12 still contains substantial thermal energy and this is recovered for water-heating purposes by the exhaust system employed.

In the specific form shown, the exhaust system comprises the two exhaust tubes 13, desirably made of the same heat-conducting metal as that of tube 32 encasing the combustion chamber 12 and equally spaced from said tube 32. These exhaust tubes 13 are connected at the bottom to the bottom of the tube 32 by the T-union 36. As the exhaust gases from the combustion chamber 12 discharge into the exhaust tubes 13 and pass upwardly therealong, residual energy in these gases is transmitted to the walls of said tubes mainly by convection, thereby heating the water surrounding said tubes. The balanced configurations of these exhaust tubes 13 in relation to the combustion chamber 12 and their lengths and diameters are such as to maintain and regularize the combustion pulsations originating in the combustion chamber. In a specific embodiment in which the combustion chamber 12 has the dimensions described above, the exhaust tubes 13 would be 27 inches long and would have an internal diameter of 1¼ inches.

In order to extract additional thermal energy remaining in the exhaust gases after passing along the lengths of the exhaust tubes 13, the terminus of the exhaust system is designed to return these exhaust gases beneath the surface B of the water A, causing said gases to bubble out from the surface into the atmosphere and to splash the water against heated metal parts of said terminus. For that purpose, there is connected to the upper end of each exhaust tube 13 the exhaust discharge devices 14, each comprising a 180° metal return bend 45, adapted to extend above the water surface in operative installed position of the heater. The downwardly extending outlet end of this bend 45 is connected to a metal discharge pipe 46 depending downwardly therefrom into the water A, and extending at its lower open end below the surface B of said water. Around the bend 45 is a metal deflector hood 47 having a top wall 48 connected to the peak of the bend by means of a bolt 50, depending sidewalls 51 flanking the outer faces of said bend and extending at their lower sections below the surface of the water, and a depending rear end wall 52 also extending at its lower section below the surface of the water. The front end of the hood 47 is open.

The discharge pipe 46 has a discharge slot 53 below the surface of the water formed in its rear inner side nearest the rear wall 52 of the hood 47. This slot 53 is shown formed by a cut 54 in the discharge pipe 46 in a plane at right angles to the axis of said discharge pipe and cuts 55 converging downwardly from the ends of said cut 54 towards the rear inner side of said discharge pipe. Part of the exhaust gas discharges from the slot 53, bubbles under water and is directed obliquely upwardly and rearwardly towards the bend 45 and towards the rear closed end of the hood 47, carrying with it water and splashing it with turbulence against the bend and the walls of the hood. This operation causes the water to absorb heat directly from the hot bend 45 and the hot hood 47.

During the periods of rarefactions in the pulse combustion cycles, the water tends to be syphoned through the lower ends of the discharge pipes 46 into the exhaust tubes 13. To prevent the water from being sucked back into the exhaust tubes 13, the bolt 50 securing the hood 47 to the bend 45 has a passageway therethrough to serve also as a syphon breaker.

The extreme lower end of the discharge pipe 46 is fully open beneath the surface of the water and tends to smooth out the surges produced by the pulsations in the combustion system.

FIG. 4 shows a modified form of fuel-air mixing device 10a in which the fuel gas is admitted into the throat region 25a of the venturi tube by means of a piezo ring 55 embedded in the ceramic lining 24a in said throat region and having an inlet 56. The fuel feed pipe 21 of FIG. 1 is eliminated, and in its stead, the solid electrode rod 27a extends along the full height of the fuel-air mixing device 10a through the insulating plug 20a at the top closing the branch 17 of the tee 15.

While the invention has been described with particular reference to specific embodiments, it is to be understood that it is not to be limited thereto but is to be construed broadly and restricted solely by the scope of the appended claims.

We claim:

1. A liquid heater of the liquid submersible type comprising a fuel-air mixing device with an outlet for discharge of combustible fuel-air mixtures, means forming a combustion chamber connected at one end to the outlet of said mixing device to receive said mixtures and comprising a heat-transmitting tubular wall enclosing said chamber, said chamber being submerged in the liquid to be heated in operative position of said heater, means for igniting the fuel-air mixtures in said chamber, an exhaust tube connected at one end to the other end of said chamber and extending along said chamber spaced therefrom, said exhaust tube having a wall of heat-transmitting material and being submerged in said liquid in operative position of said heater, and means at the other end of said exhaust tube for discharging the exhaust gases from said exhaust tube in said liquid below the surface of said liquid in operative position of said heater.

2. A liquid heater as described in claim 1, comprising a second exhaust tube connected at one end to said other end of said combustion chamber and extending along said chamber spaced therefrom, said second exhaust tube having a wall of heat-transmitting material and being also submerged in said liquid in operative position of the heater, and a second means at the other end of said second exhaust tube for discharging the exhaust gases from said second exhaust tube in said liquid below the surface of said liquid in operative position of said heater.

3. A liquid heater as described in claim 1, said discharging means comprising conduit means having heat-transmitting walls located above the level of the liquid in operative position of the heater, and having a discharge pipe connected to the outlet of said conduit means and provided with a discharge opening in position to be submerged in the liquid in operative position of the heater, said discharge opening being located in position to cause liquid carried by the exhaust gases discharged from said discharge opening to be directed and splashed against the heat-transmitting walls of said conduit means in operative position of the heater.

4. A liquid heater as described in claim 3, said conduit means comprising a metal return bend connected to said other end of said exhaust tube, said discharge pipe being connected to the outlet of said bend, and said discharge opening being located on the inner side of said discharge pipe nearest said exhaust tube.

5. A liquid heater as described in claim 4, comprising a hood of heat-transmitting material connected to said bend and enclosing said bend, said hood being open at one end, said discharge opening being positioned to direct the exhaust gases discharged from said discharge opening as well as the liquid carried by the latter gases against said bend and said hood.

6. A liquid heater comprising a fuel-air mixing device including a venturi tube defining a throat region, means for admitting air into said tube on the upstream side of said throat region, and means for admitting fuel gas directly into the throat region of said tube, aided by the inspirating effect of the air passing through said throat to form fuel-air combustible mixtures, means forming a combustion chamber communicating with the discharge end of said tube to receive said fuel-air mixtures and including a heat-transmitting tubular wall enclosing said chamber, and means for igniting the mixtures in said chamber comprising an electrically grounded screen across the downstream end of said tube, an insulating spacer supported in said screen, and a spark-generating electrode rod extending along said venturi tube and passing at its terminal end through said spacer and into said combustion chamber, said spacer separating the terminal spark-emitting end of said electrode rod and said screen by a spark gap.

7. A liquid heater as described in claim 6, said electrode rod having a tubular section provided with discharge port means at said throat region and constituting said means for admitting fuel gas into said throat region.

8. A liquid heater of the submersible type comprising means forming a combustion chamber and comprising a heat-transmitting tubular wall enclosing said chamber, said combustion chamber being submerged in the liquid to be heated in operative position of the heater, means for delivering combustible mixtures of fuel and air into said chamber and for igniting said mixtures, a body of material having high heat radiation potential, located in said chamber, said body being spaced from said tubular wall and having its surface exposed to combustion action in said chamber to cause said body to be heated to a degree to emit radiant energy from said body to said wall to heat said wall, means for carrying on combustion in said chamber as a succession of pulses, the ignition and initiation of combustion taking place in the headspace of said combustion chamber, said means for carrying on pulse combustion comprising an annular screen in said headspace equally spaced peripherally from said tubular wall to prevent quenching of combustion in said headspace.

9. A liquid heater of the submersible type comprising means forming a combustion chamber having a headspace and comprising a heat-transmitting tubular wall enclosing said chamber, said combustion chamber being submerged in the liquid to be heated in operative position of the heater, means for delivering combustible mixtures of fuel and air into said headspace, means for igniting and initially said mixtures in said headspace, means for carrying out combustion in and throughout said headspace as a regular sequence of pulses with alternate phases of lower and higher pressures, and comprising a rod of material having high heat radiation potential spaced from one end of said headspace to define the other end of said headspace and confining said headspace to a volume sufficiently restricted to permit generation of regular combustion pulses in said headspace, said rod extending from said headspace along said tubular wall and being peripherally spaced from said wall to form a space around a said rod communicating with said headspace at said other end of said headspace, the end of said rod nearest said headspace being directly in the region of combustion in said headspace to cause some combustion in said headspace to take place directly on the surface of said rod end.

10. A liquid heater as described in claim 9, said means for igniting initially the combustible mixtures being adapted to be rendered inoperative after combustion in said headspace has been established, said rod being of a material to reignite the combustible mixture in the headspace in case combustion is interrupted in said headspace after said means for initially igniting the combustible mixture has been red rendered inoperative.

11. A liquid heater as described in claim 9, said means for carrying out combustion in and throughout said headspace comprising means for continuing combustion in said space and along the surface of said rod along said space.

12. A liquid heater of the submersible type comprising means forming a combustion chamber having a headspace and comprising a heat-transmitting tubular wall enclosing said chamber, said combustion chamber being submerged in the liquid to be heated in operative position of the heater, means for delivering combustible mixtures of fuel and air into said headspace, means for igniting said mixtures in said headspace, a rod of material having high radiation potential spaced from one end of said headspace to define the other end of said headspace and confining said headspace to a volume sufficiently restricted to cause combustion in said headspace to take place throughout said headspace and to an incomplete extent, said rod extending from said headspace along said tubular wall and being peripherally spaced from said wall to form a space around said rod communicating with said headspace at said end of said headspace, the end of said rod nearest said headspace being directly in the region of combustion in said headspace to cause some combustion in said headspace to take place directly on the surface of said rod end, the combustion in said headspace being continued in said space and over the peripheral surface of said rod.